United States Patent
Hoffmann et al.

(10) Patent No.: US 8,292,264 B2
(45) Date of Patent: Oct. 23, 2012

(54) FLOW ADJUSTMENT APPARATUS AND METHOD FOR LIMITING THE TRAVEL OF AN ACTUATING ROD OF AN ACTUATOR OF THE FLOW ADJUSTMENT APPARATUS

(75) Inventors: Heinfried Hoffmann, Frankfurt (DE); Joerg Kiesbauer, Eppertshausen (DE); Eugen Nebel, Nidderau-Windecken (DE)

(73) Assignee: Samson Aktiengesellschaft, Frankfurt (DE)

( * ) Notice: Subject to any disclaimer, the term of this patent is extended or adjusted under 35 U.S.C. 154(b) by 1267 days.

(21) Appl. No.: 11/959,000

(22) Filed: Dec. 18, 2007

(65) Prior Publication Data
US 2008/0149875 A1    Jun. 26, 2008

(30) Foreign Application Priority Data
Dec. 22, 2006  (DE) .......... 10 2006 061 017

(51) Int. Cl.
*F16K 51/00* (2006.01)
(52) U.S. Cl. .......... 251/285; 251/291; 251/60
(58) Field of Classification Search .......... 251/285, 251/284, 60, 128, 291, 121
See application file for complete search history.

(56) References Cited

U.S. PATENT DOCUMENTS

| | | | | |
|---|---|---|---|---|
| 3,183,926 A * | 5/1965 | Boudot | .......... | 137/270 |
| 3,517,697 A * | 6/1970 | Holzschuh et al. | ...... | 137/625.33 |
| 3,648,718 A | 3/1972 | Curran | | |
| 4,489,756 A * | 12/1984 | Balz | .......... | 137/625.33 |
| 4,699,354 A | 10/1987 | Gibson et al. | | |
| 5,052,430 A * | 10/1991 | Trautwein | ................ | 137/315.35 |
| 6,886,805 B2 * | 5/2005 | McCarty | .......... | 251/214 |
| 6,905,108 B2 | 6/2005 | Hall et al. | | |
| 2004/0149951 A1 * | 8/2004 | Gethmann | ...... | 251/291 |

FOREIGN PATENT DOCUMENTS

| | | |
|---|---|---|
| DE | 1 043 739 | 11/1958 |
| DE | 1 226 847 | 10/1966 |
| DE | 1 675 512 | 12/1970 |
| DE | 33 20 574 | 1/1985 |
| DE | 94 12 274.1 | 1/1995 |
| DE | 197 23 993 | 3/1999 |

OTHER PUBLICATIONS

Tuchenhagen Varient system—SAMS10021—Oct. 1988.
Tuchenhagen Factory of Engineers SAS10021—Before 1993.
Sampson Series 240 valve—Dec. 1994.

* cited by examiner

*Primary Examiner* — John K Fristoe, Jr.
*Assistant Examiner* — Andrew J Rost
(74) *Attorney, Agent, or Firm* — Schiff Hardin LLP

(57) ABSTRACT

In a valve system or method, an actuator is provided with an actuating rod. A valve is actuated by the rod and has a valve stem and a valve member secured thereto. A travel limiting device defines a travel limit of the actuating rod. A setting mechanism sets the travel limit. The actuating rod and valve stem are decouplable from each other. The setting mechanism comprises a connector for coupling the actuating rod and the valve stem, the connector being designed to set an axial spacing between the actuating rod and the valve stem.

16 Claims, 2 Drawing Sheets

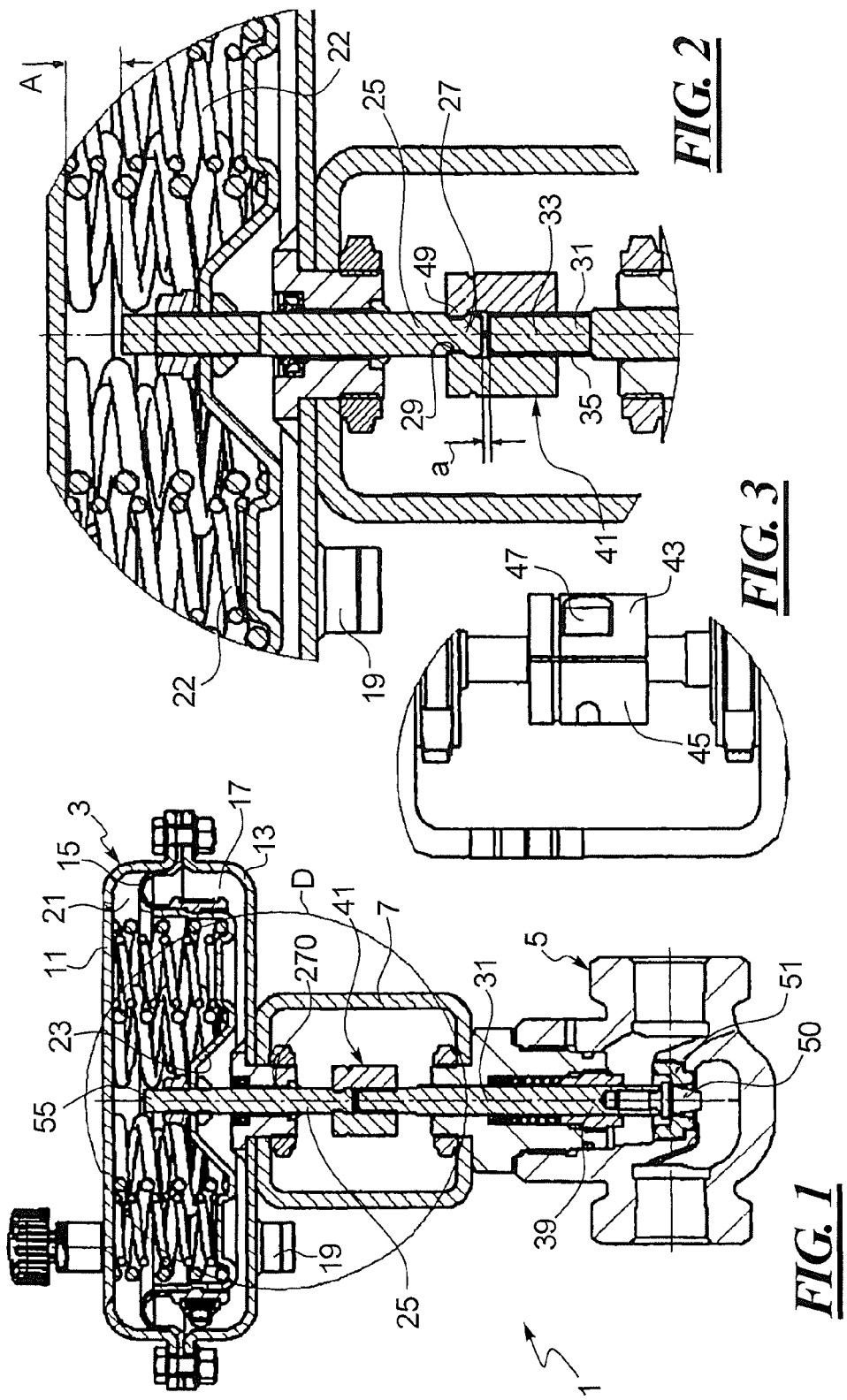

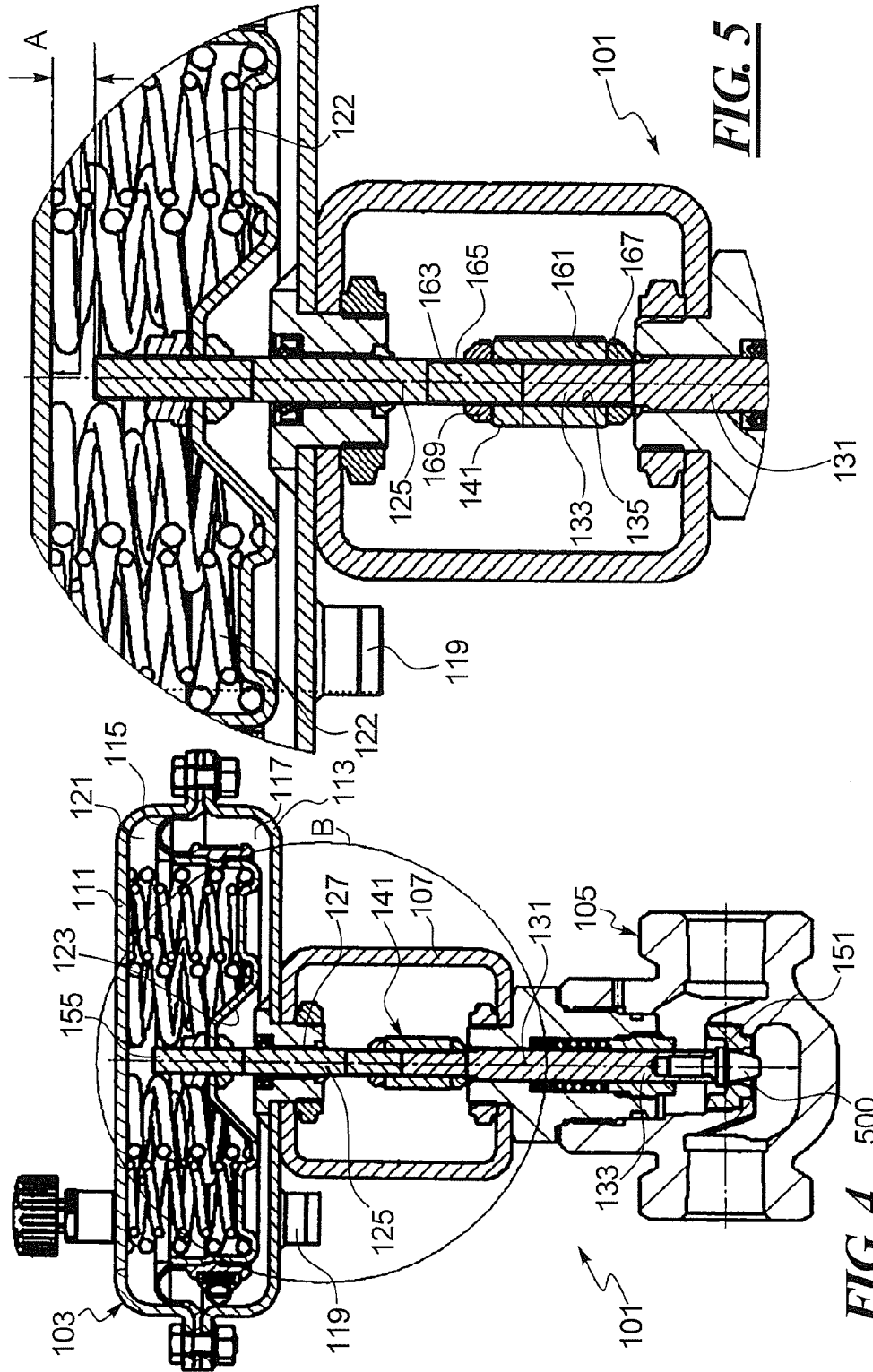

FLOW ADJUSTMENT APPARATUS AND METHOD FOR LIMITING THE TRAVEL OF AN ACTUATING ROD OF AN ACTUATOR OF THE FLOW ADJUSTMENT APPARATUS

BACKGROUND

The preferred embodiment relates to a flow adjustment apparatus including an actuator and a valve actuated thereby.

The actuator which in the field of process engineering, nuclear power systems, petrochemical plants or the like, may be configured as a pneumatic actuator, for example, features an actuating rod which is translationally displaced to perform as a lift actuator. The actuating rod extends up to the valve and ends in a valve member which is traveled to close or open a valve seat in the passage of a fluid line.

Many types of flow adjustment apparatuses need to satisfy extremely stringent safety regulations. For example, emergency OFF valves or emergency shut down valves are required to attain an emergency position with exceptionally high reliability in which the valve member fully opens or closes the valve seat when the plant develops a fault.

A generic flow adjustment apparatus is known from U.S. Pat. No. 6,905,108 B2 which features a pneumatic linear actuator of lift actuator with a travel limiting device intended to prevent over-travel of the actuating rod of the actuator particularly when the lift actuator is fully actuated pneumatically. The travel limiting device is achieved by two collar halves of a two-piece collar each including serrations on an interior surface shaped and sized to mate with actuating rod serrations disposed on the valve actuating rod. By releasing two setscrews interconnecting the two collar halves secure to the actuating rod, the position of the travel limiting device can be set relative to the outer wall of the actuator housing acting as a stopper in thus limiting the travel of the actuating rod.

It has been discovered that assembling this known flow adjustment apparatus is a major problem when the actuating rod of the actuator together with the valve member needs to be inserted in the valve housing. In addition to this, locating the travel limiting device freely accessible on the outside of the actuating rod has proven to be a source of potential malfunctioning since, especially in faulty operation of the plant, objects can become lodged between the travel limiting device and the stopper wall of the housing, resulting in an unwanted change in limiting the travel. But the main disadvantage experienced with this known version of the flow adjustment apparatus is its highly complicated assembly when it is to be retrofitted by replacing the actuator without detrimenting the valve structure.

SUMMARY

It is an object to define a flow adjustment apparatus which provides a very safe travel limit function while assuring facilitated and expedient assembly and retrofitting of the flow adjustment apparatus.

In a valve system or method, an actuator is provided with an actuating rod. A valve is actuated by the rod and has a valve stem and a valve member secured thereto. A travel limiting device defines a travel limit of the actuating rod. A setting mechanism sets the travel limit. The actuating rod and valve stem are decouplable from each other. The setting mechanism comprises a connector for coupling the actuating rod and the valve stem, the connector being designed to set an axial spacing between the actuating rod and the valve stem.

BRIEF DESCRIPTION OF THE DRAWINGS

FIG. 1 is a cross-sectional view of the flow adjustment apparatus in accordance with the preferred embodiment in a first aspect;

FIG. 2 is a detail view of the portion D as shown in FIG. 1;

FIG. 3 is a partial side view of a section of the portion as shown in FIG. 2;

FIG. 4 is a section view of a second aspect of the flow adjustment apparatus in accordance with the preferred embodiment; and FIG. 5 is a detail view in accordance with section B as shown in FIG. 4.

DESCRIPTION OF THE PREFERRED EMBODIMENT

For the purposes of promoting an understanding of the principles of the invention, reference will now be made to the preferred embodiment/best mode illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

With the preferred embodiment the actuating rod and valve stem can be decoupled from each other. In addition, the mechanism in accordance with the preferred embodiment for setting the travel limit of the actuator features a mechanical connector for coupling the actuating rod and valve stem, this connector being designed to set an axial spacing between actuating rod and valve stem. This means in accordance with the preferred embodiment decoupling of the actuating rod from the valve stem now greatly simplifies, for one thing, retrofitting, and assembling the flow adjustment apparatus. For another, it has been surprisingly discovered that these techniques in conjunction with being able to set the axial spacing now makes it simple to reliably vary the travel limit of the flow adjustment apparatus with a fixed stop position. The greater the setting spacing between the actuating rod and the valve stem the longer is the axial length of the overall assembly of actuating rod and valve stem, and thus the shorter the travel limit. The preferred embodiment makes it possible to no longer arrange a stop necessarily on an outside of the actuator housing and actuating rod critical to safe operation, but, for example, within the actuator itself safe from being influenced by external effects. In other words, the preferred embodiment structurally separates the stop function and setting the travel limit while assuring facilitated access externally to set the spacing.

In one preferred aspect of the preferred embodiment setting the spacing is infinitely variable.

In one preferred embodiment the connector is fixedly, particularly releasably secured to the actuating rod while being movably and particularly releasably secured to the valve stem such that the valve stem can be shifted longitudinally relative to the connector in maintaining the connection to the valve stem. The connector thus provides a fixed connection of the actuating rod whilst a coupling location shiftably located along the valve stem permits adjusting the setting spacing. Preferably the fixed connection between the connector and the actuating rod is formed positively. This positive contact can be achieved, for example, by a protuberance for engaging a groove shaped complementary. Preferably the groove is machined in the actuating rod while the protuberance is formed on the connector.

As an alternative, the connector is movably and particularly releasably connected to the actuating rod and to the valve stem in that the valve stem and actuating rod can be shifted longitudinally relative to the connector while maintaining the connection in each case, so that, in other words, the spacing between the valve stem and the actuating rod can be increased or decreased by shifting the connection location of the connector longitudinally both along the actuating rod and along the valve stem. A simple movable connection can be achieved by means of a threaded or serrated mating connection.

In another preferred aspect of the preferred embodiment the connector is free from a travel limit function by the function of the travel limiting device and the connector for setting the travel limit being structurally separated. To advantage the travel limiting device can be configured within the housing of the actuator.

For example, the travel limiting device may be formed by means of a fixed portion at the actuating rod, particularly by the free end of the actuating rod at the actuator side, the fixed portion preferably being stopped by a component within the housing of the actuator, particularly by the inner wall of the housing to limit the travel.

In another preferred aspect of the preferred embodiment on the connector is formed by at least two removable shells, preferably half shells. The removable shells clasp the valve stem and actuating rod to intercouple the latter. Preferably the shells are serrated on the inside, particularly threaded to mate with an outer serration, particularly a male thread at least on the valve stem, preferably on both the rod and stem. By means of the serrations the location connecting the valve stem and the actuating rod can be longitudinally set.

Preferably the connector is machined on the outside flat at least in part so that a turning force can be communicated to the connector with threaded mating, particularly with the aid of a wrench for varying the axial setting spacing between the valve stem and the actuating rod.

As an alternative, the connector may feature a sleeve particularly machined with a female thread. When fitted, the sleeve clasps both the actuating rod and the valve stem in thus enabling the valve stem and actuating rod to be telescoped in and out of the sleeve. In addition, the connector comprises a locknut on the valve stem and on the actuating rod each, to avoid the sleeve automatically relocating relative to the valve stem and the actuating rod. Preferably the locknuts are machined counter-threaded. In this arrangement particularly the locknut at the valve stem side and the sleeve may be unidirectionally threaded to mate with a corresponding male thread of the valve stem. The locknut at the actuating rod side may be machined counter-threaded to mate with a corresponding male thread of the actuating rod.

In addition, the preferred embodiment relates to a method of setting the travel limit of an actuating rod of an actuator of a flow adjustment apparatus for actuating a valve with a valve stem and a valve member secured thereto. In accordance with the preferred embodiment the actuating rod and the final positioning rod are machined from two separate rod parts, the definable spacing between the actuating rod and the valve stem for setting the travel limit of the actuating rod being adjustable.

Preferably the method is performed in accordance with the way in which the flow adjustment apparatus in accordance with the preferred embodiment functions.

Referring to FIGS. 1 to 3 there is illustrated the flow adjustment apparatus in accordance with the preferred embodiment in a first aspect as designated generally by the reference numeral 1, the main components of which are a pneumatic lift actuator 3, a valve 5 and a mount 7 supporting the pneumatic lift actuator 3 at the valve 5.

The pneumatic linear actuator 3 comprises two housing halves 11, 13 with a U-shaped cross-section sealingly bolted to each other edgewise. Disposed between bolted edge flanges is a partitioning diaphragm 15 dividing the interior of the pneumatic lift actuator 3 into two chambers 17, 21 each sealed off from the other. The partitioning diaphragm 15 is fixedly connected to a stiffener plate 23 arranged in the middle, to which the actuating rod 25 is secured. The actuating rod 25 extends through a passage 270 in the lower housing half 13, out of the pneumatic lift actuator 3 into the region of the mount 7. The passage 270 is formed by means of a sealing sleeve in which a recess is machined for mounting a sealing ring to thus achieve a dynamic seal for the translational motion of the actuating rod 25 relative to the housing of the pneumatic lift actuator 3.

The lower chamber 17 includes a port 19 for connecting it to a supply of compressed air (not shown). The upper chamber 21 houses a plurality of biased coil springs 22.

Substantially in the middle of the mount 7 the actuating rod 25 ends, its end 27 being provided with a circumferential groove 29. Contacting the actuating rod 25 inline axially is a valve stem 31 the end portion 33 at the actuating end featuring a male thread 35.

Referring now to FIG. 1 there is illustrated how the valve stem 31 extends substantially from the middle of the mount 7 to an end 39 at the valve side in which a valve member 50 is fixedly inserted. The end portion 33 at the actuating rod side of the valve stem 31 is coupled positionally adjustable to the actuating rod 25 by a mechanical connector 41 which in the aspect as shown in FIGS. 1 to 3 is formed by two half-shells 43, 45 with at least one screw 47 for securing them together to tension and grip the actuating rod 25 as well as the valve stem 31.

Both half-shells 43, 45 are machined on the inside with a female thread pitched to coincide with the male thread 35 of the valve stem 31.

The half-shells 43, 45 feature at their edge at the actuating rod side a circumferential nose 49 facing radially inwards and shaped to complement the groove 29 in the actuating rod 25. Engagement of the nose 49 in the groove 29 assures solid securement of the connector 41 at the actuating rod 25.

In the operating position as shown in FIG. 1 the valve member 41 seals a valve seat 51, this operating position corresponding to an emergency position, namely, when no compressed air pressure exists within the lower chamber 17 and the biased coil springs 22 can release their spring force to position the valve member together with its valve stem 31 via the connector 41 and the actuating rod 25 as shown in FIG. 1.

So that when the lower chamber 17 is pressurized the actuating rod 25 and thus the valve stem 31 are not retracted too far from the operating position as shown in FIG. 1 a travel limiting device is provided intended to limit the maximum lift of the actuating rod 25. The travel limiting device is formed by the upper, free end 55 of the actuating rod 25 to be stopped by the inner side of the upper housing half 11 as soon as the compressed air pressure in the lower chamber 17 supplied via the port 19 is excessive.

The connector 41 has in accordance with the preferred embodiment the task of setting the maximum travel A of the actuating rod 25 by altering the spacing a between the ends of the actuating rod 25 and the valve stem 31.

This spacing a can be adjusted by loosening the half-shells 43, 45 from the valve stem 31 and then turning the half-shells 43, 45 to displace the actuating rod 25 away from the valve stem 31 or vice-versa. Another possibility of setting the spacing a is to remove the half-shells 43, 45 from the valve stem 31 and actuating rod 25 to permit moving the actuating rod 25 relative to the valve stem 31 manually, the latter being fixed in place by the valve being seated.

Referring now to FIGS. 4 and 5 there is illustrated a second aspect of the flow adjustment apparatus in which like components are identified by like reference numerals with reference to FIGS. 1 to 3, but elevated by 100, for a better appreciation of the description of the FIGs.

The flow adjustment apparatus 101 as shown in FIGS. 4 and 5 differs mainly from the flow adjustment apparatus as shown in FIGS. 1 to 3 by the structure of the connector 141. The connector 141 has a sleeve 161 machined with a female thread having the same pitch as the male thread 135 of the valve stem 131. A valve member 500 is attached to one end of valve stem 131. The sleeve 161 has essentially a constant inner diameter.

The actuating rod 125 has at its end portion 163 at the valve stem side an outer diameter slightly smaller than the inner diameter of the female thread of the sleeve 161 so that a male thread of the actuating rod 125 cannot come into conflict with the female thread of the sleeve 161.

The male thread 165 of the end portion 163 at the valve stem side in the actuating rod 125 is designed opposite in sense to that of the male thread 135 of the valve stem and to that of the female thread of the sleeve 161. To precisely position the sleeve 161 in avoiding the sleeve 161 becoming displaced of its own accord relative to the valve stem 131 and to the actuating rod 125 a locknut 167 is provided at the valve stem 131. The male thread 135 of the valve stem 131, the thread of the locknut 167 as well as the female thread of the sleeve 161 are left-handed while the male thread 165 on the actuating rod 125 as well as a female thread of a locknut 169 for locating the connector 141 at the actuator side are right-handed.

In the aspect as shown in FIGS. 4 and 5 too, the travel can be limited to A by setting the spacing as indicated (but not detailed) in FIGS. 4 and 5 between the facing ends of the actuating rod 125 and valve stem 131. This is done by loosening one of the locknuts 167, 169 and turning the sleeve 161 so as to shift the sleeve and thus the actuating rod 125 relative to the axially fixedly located valve stem 131 and to the stopping inner side of the upper housing cover 111.

While a preferred embodiment has been illustrated and described in detail in the drawings and foregoing description, the same is to be considered as illustrative and not restrictive in character, it being understood that only the preferred embodiment has been shown and described and that all changes and modifications that come within the spirit of the invention both now or in the future are desired to be protected.

We claim as our invention:

1. A valve system, comprising:
   an actuator with an actuating rod;
   a valve actuated by the rod, said valve having a valve stem and a valve member non-adjustably secured to the valve stem;
   a travel limiting device defining a travel limit of the actuating rod;
   only a single setting mechanism for setting the travel limit;
   the actuating rod and the valve stem being decouplable from each other, and the setting mechanism comprising a connector for coupling the actuating rod and the valve stem, said connector being designed to set an axial spacing between the actuating rod and the valve stem; and
   said travel limiting device comprising an end of the actuating rod, and the end of the actuating rod being stopped by directly abutting against a non-adjustable component within a housing of the actuator.

2. A valve system as set forth in claim 1 wherein the spacing being set is continuously variable.

3. A valve system as set forth in claim 1 wherein the connector is fixedly connected to the actuating rod while being movably connected to the valve stem such that the valve stem can be shifted axially relative to the connector in maintaining the connection.

4. A valve system as set forth in claim 3 wherein the fixed connection between the connector and the actuating rod is formed positively.

5. A valve system as set forth in claim 3 wherein the movable connection is achieved by a threaded mating connection.

6. A valve system as set forth in claim 1 wherein the connector is movably connected to the actuating rod and the valve stem such that the valve stem and actuating rod can be shifted axially relative to the connector while maintaining the connection in each case.

7. A valve system as set forth in claim 1 wherein the component within the housing of the actuator comprises an inner wall of the housing.

8. A valve system as set forth in claim 1 wherein the connector is formed by at least two retained together removable shells.

9. A valve system as set forth in claim 1 wherein the connector is machined with an outside flat at least in part so that a turning force can be communicated to the connector.

10. A valve system as set forth in claim 1 wherein the connector is formed by a sleeve and a locknut on the valve stem and a locknut on the actuating rod.

11. A valve system as set forth in claim 10 wherein the locknuts are machined counter threaded.

12. A valve system as set forth in claim 1 wherein said end of said actuating rod is stopped by said non-adjustable component as soon as compressed air pressure within said actuator becomes excessive.

13. A method for setting a valve system, comprising the steps of:
    providing an actuator with an actuating rod;
    providing a valve actuated by the rod, said valve having a valve stem and a valve member non-adjustably secured to the valve stem;
    providing a travel limiting device defining a travel limit of the actuating rod;
    providing only a single setting mechanism for setting the travel limit;
    providing the actuating rod and the valve stem decouplable from each other, the setting mechanism comprising a connector for coupling the actuating rod and the valve stem, said connector being designed to set an axial spacing between the actuating rod and the valve stem;
    providing said travel limiting device comprising an end of the actuating rod, and the end of the actuating rod being stopped by directly abutting against a non-adjustable component within a housing of the actuator; and
    setting the valve system by adjusting the setting mechanism for setting the travel limit.

14. A method as set forth in claim 13 including the step of protecting against excessive compressed air pressure in said actuator by stopping said end of said actuator rod by said non-adjustable component as soon as the compressed air pressure is excessive.

15. A valve system, comprising:
- an actuator with an actuating rod;
- a valve actuated by the rod, said valve having a valve stem and a valve member non-adjustably secured to the valve stem;
- a travel limiting device defining a travel limit of the actuating rod;
- only a single setting mechanism for setting the travel limit;
- the actuating rod and the valve stem being decouplable from each other, and the setting mechanism comprising a connector for coupling the actuating rod and the valve stem, said connector being designed to set an axial spacing between the actuating rod and the valve stem; and
- said travel limiting device comprising a fixed portion at the actuating rod, and the fixed portion being stopped by a non-adjustable component within a housing of the actuator.

16. A method for setting a valve system, comprising the steps of:
- providing an actuator with an actuating rod;
- providing a valve actuated by the rod, said valve having a valve stem and a valve member non-adjustably secured to the valve stem;
- providing a travel limiting device defining a travel limit of the actuating rod;
- providing only a single setting mechanism for setting the travel limit;
- providing the actuating rod and the valve stem decouplable from each other, the setting mechanism comprising a connector for coupling the actuating rod and the valve stem, said connector being designed to set an axial spacing between the actuating rod and the valve stem;
- providing said travel limiting device comprising a fixed portion at the actuating rod, and the fixed portion being stopped by a non-adjustable component within a housing of the actuator; and
- setting the valve system by adjusting the setting mechanism for setting the travel limit.

* * * * *